United States Patent [19]

Haake

[11] Patent Number: 5,602,955
[45] Date of Patent: Feb. 11, 1997

[54] MICROACTUATOR FOR PRECISELY ALIGNING AN OPTICAL FIBER AND AN ASSOCIATED FABRICATION METHOD

[75] Inventor: John M. Haake, St. Charles, Mo.

[73] Assignee: McDonnell Douglas Corporation, St. Louis, Mo.

[21] Appl. No.: 473,106

[22] Filed: Jun. 7, 1995

[51] Int. Cl.$^6$ ................................................. G02B 6/42
[52] U.S. Cl. ........................................... 385/136; 385/88
[58] Field of Search .......................... 385/88–94, 134, 385/136, 137

[56] References Cited

U.S. PATENT DOCUMENTS

| | | | |
|---|---|---|---|
| 3,836,225 | 9/1974 | Wilde et al. | 385/115 |
| 4,303,302 | 12/1981 | Ramsey et al. | 385/23 |
| 4,357,072 | 11/1982 | Goodfellow et al. | 385/91 |

(List continued on next page.)

FOREIGN PATENT DOCUMENTS

| | | |
|---|---|---|
| 2128768 | 8/1983 | United Kingdom . |
| 2146841 | 8/1984 | United Kingdom . |

OTHER PUBLICATIONS

*Piezoelectric Voltage and Unimorphs, Bimorphs, and Stacks*, Morgan Matroc, Inc. publication, p. 5. [No Date].
Melles Griot catalog, *Nanopositioning Technology*, 14 pp. [No Date].
High Gain (21 dB) Packaged Semiconductor Optical Amplifiers, *Electronics Letters*, vol. 27, No. 20, Sep. 26, 1991, pp. 1842–1843, R. Boudreau et al.
Fiber Attachment For Guided Wave Devices, *Journal of Lightwave Technology*, vol. 6, No. 6, Jun. 1988, pp. 862–871, E. J. Murphy.
High Reliability Packaging For Fibre Optic Sources, *SPIE*, vol. 717 Reliability Considerations In Fiber Optic Applications, 1986, pp. 63–73, A. Rosiewicz. [No Month].
H. M. Presby and C. A. Edwards, Near 100% Efficient Fibre Microlenses, *Electronic Letters*, 12th Mar. 1992, pp. 582–584.
A. Rogner, W. Ehrfeld, D. Münchmeyer, P. Bley, C. Burbaum and J. Mohr, *LIGA–Based Flexible Microstructures For Fiber–Chip Coupling*, IMM Institut für Mikrotechnik GmbH, 1991, pp. 167–170. [No Month].
Lynn Haber, Opto–electronics Bets On Low Cost, *Lightwave*, Feb. 1995, pp. 1 & 23.
George Kotelly, Opto–electronics—High–volume, Low–cost Devices Needed, *Lightwave*, Feb. 1995, 1 page.
R. J. Pimpinella, A New Type Of Fiber Optic Connector Designed For Military Optical Backplanes, *Proceedings Of The 42nd ECTC Conference*, May 18–20, 1992, pp. A61–A65.
Melles Griot Catalog, *Nanopositioning Guide, Components and Systems For Fiber Optics, Optics, Lasers and Integrated Optics.* (1993) [No Month].

*Primary Examiner*—John D. Lee
*Attorney, Agent, or Firm*—Bell, Seltzer, Park & Gibson, P.A.

[57] ABSTRACT

A microactuator for precisely aligning an optical fiber with an optical device includes a carrier having at least one bimorphic actuator which bends or deflects in response to electrical stimuli to thereby controllably position the carrier and, in turn, an optical fiber mounted on the carrier, with an optical device, such as a laser diode. The bimorphic actuator includes first and second layers of first and second materials, respectively, which respond differently to electrical stimuli. For example, the first and second materials can have different coefficients of thermal expansion or one of the materials can be a piezoelectric material such that application of electrical stimuli to the bimorphic actuator will deflect the actuator by a precisely controllable amount. The carrier can also be mounted on an alignment support structure such that upon deflecting the bimorphic actuator is urged against a portion of the alignment support structure so as to move the carrier relative to the alignment support structure. Thus, by maintaining the alignment support structure in a fixed relation to the optical device, the carrier and, in turn, the optical fiber mounted on the carrier can be positioned in precise alignment with the optical device.

37 Claims, 3 Drawing Sheets

U.S. PATENT DOCUMENTS

| | | | |
|---|---|---|---|
| 4,523,802 | 6/1985 | Sakaguchi et al. | 385/91 |
| 4,652,081 | 3/1987 | Fatatry | 385/22 |
| 4,679,908 | 7/1987 | Goodwin | 385/91 |
| 4,688,885 | 8/1987 | Poteat et al. | 385/90 |
| 4,701,013 | 10/1987 | Jurczyszyn et al. | 385/15 |
| 4,702,547 | 10/1987 | Enochs | 385/88 |
| 4,720,163 | 1/1988 | Goodwin et al. | 385/90 |
| 4,741,796 | 5/1988 | Althaus et al. | 156/272.4 |
| 4,796,975 | 1/1989 | Lukas et al. | 385/50 |
| 4,798,439 | 1/1989 | Preston | 385/91 |
| 4,802,727 | 2/1989 | Stanley | 385/89 |
| 4,844,577 | 7/1989 | Ninnis et al. | 385/9 |
| 4,867,524 | 9/1989 | Courtney et al. | 385/14 |
| 4,934,778 | 6/1990 | Gillett | 385/55 |
| 4,955,683 | 9/1990 | Shiga et al. | 385/88 |
| 5,080,458 | 1/1992 | Hockaday | 385/14 |
| 5,080,461 | 1/1992 | Pimpinella | 385/65 |
| 5,123,073 | 6/1992 | Pimpinella | 385/59 |
| 5,181,214 | 1/1993 | Berger et al. | 385/34 |
| 5,214,727 | 5/1993 | Carr et al. | 385/22 |
| 5,450,508 | 9/1995 | Decusatis et al. | 385/94 X |
| 5,457,765 | 10/1995 | Suzuki et al. | 385/65 X |
| 5,483,608 | 1/1996 | Yokomachi et al. | 385/22 |

MICROACTUATOR FOR PRECISELY ALIGNING AN OPTICAL FIBER AND AN ASSOCIATED FABRICATION METHOD

GOVERNMENT RIGHTS

The United States Government has rights in this invention pursuant to a contract awarded by the Department of the Army.

FIELD OF THE INVENTION

The present invention relates generally to methods and apparatus for controllably positioning an optical fiber and, more particularly, to a microactuator for precisely aligning an optical fiber with an optical device and an associated fabrication method.

BACKGROUND OF THE INVENTION

It is oftentimes desirable to align optical fibers with an electro-optic device, such as a laser diode. Such alignment is particularly desirable in order to maximize the percentage of light coupled from the light source or electro-optic device to the optical fiber and to thereby increase the transmission efficiency of the optical signals. However, the alignment of optical fibers is complicated by the relatively small sizes of both the optical fiber waveguide, such as a single mode optical fiber which, for example, can have a light transmitting core diameter of approximately 2–10 micrometers, and the light source which has approximately the same size.

The alignment of an optical fiber is further complicated since an optical fiber generally has six degrees of freedom, each of which must be separately aligned. In particular, an optical fiber must generally be aligned in three translational directions, i.e., the X, Y and Z directions, and three rotational directions, i.e., $\theta_X$, $\theta_Y$ and $\theta_Z$. Furthermore, the alignment of polarization preserving or polarization maintaining optic fibers is complicated by the need to maintain the polarization axis of the optical fibers in alignment with that of the polarized optical system.

Notwithstanding these difficulties, various methods have been proposed to align a single optical fiber with a variety of electro-optic devices. See, for example, U.S. Pat. No. 4,955,683 which was issued Sep. 11, 1992, to Nobuo Shiga, et al. and is assigned to Sumitomo Electric Industries, Ltd.; U.S. Pat. No. 4,798,439 which was issued Jan. 17, 1989, to Keith Preston and is assigned to British Telecommunications, PLC; U.S. Pat. No. 4,741,796 which was issued May 3, 1988, to Hans Althaus, et al. and is assigned to Siemens Aktiengesellschaft; U.S. Pat. No. 4,702,547 which was issued Oct. 27, 1987, to R. Scott Enochs and is assigned to Tektronix, Inc.; U.K. Patent Application GB 2,128,768 which was published May 2, 1984, and is assigned to Hitachi Ltd.; and U.K. Patent Application GB 2,146,841 which was published Apr. 24, 1985, and is assigned to Hitachi Ltd.

As illustrated by these patents and known to those skilled in the art, individual metallized optical fibers can be soldered to a support. In order to position the optical fiber, the solder bonding the metallized optical fiber to the support is generally heated to a temperature above the predetermined melting temperature of the solder. Thereafter, the optical fiber can be moved and, once the optical fiber is properly positioned, the solder can be allowed to cool and resolidify to fix the position of the optical fiber relative to the support and, more importantly, to a light source. These systems typically require, however, some means, such as solder, for retaining an optical fiber in place after the optical fiber has been positioned in a separate alignment process, distinct from the means for retaining the optical fiber in position.

In particular, U.S. Pat. No. 4,798,439 to Keith Preston (hereinafter the "'439 patent") describes an optical assembly and a related method for mounting optical components, such as an optical fiber, on a substrate. According to the '439 patent, an optical fiber is lowered into a layer of solder, such as a solder preform or a solder paste, which has been applied to a submount assembly. Thereafter, a heating element is lowered into contact with the solder to locally melt the solder about the optical fiber such that the optical fiber can be mounted therein. During the mounting process, a first end of the optical fiber is positioned to receive the output of a laser, also illustratively mounted on the submount assembly. By positioning the optical fiber such that the power level of the light transmitted through the optical fiber is maximized, the optical fiber is appropriately aligned with the laser. Once aligned, the heating element is cooled to allow the solder to solidify and to fix the optical fiber to the submount assembly.

Another method of positioning an optical fiber is described in U.S. Pat. No. 4,741,796 to Hans Althaus, et al. (hereinafter the "'796 patent"). In particular, the '796 patent describes a method for aligning an optical fiber with a laser diode. According to this method, an electrically conductive body having a groove defined therein is bonded to a base. An optical fiber extends through the groove and is bonded to the electrically conductive body with a bonding agent. By inducing current flow through the electrically conductive body, the temperature of the electrically conductive body is increased such that the optical fiber is positionable within the bonding agent. After properly positioning the optical fiber relative to the laser diode, the current flow is stopped to cool and solidify the bonding agent, thereby fixing the position of the optical fiber.

While the above-described alignment and bonding systems may controllably position an individual optical fiber, the heat required to allow one optical fiber to be positioned can oftentimes affect the position or alignment of adjacent optical fibers, thereby misaligning the adjacent optical fibers. In addition, these alignment and bonding systems and methods, such as the systems disclosed by the '439 patent and the '796 patent, are generally relatively laborious and time-intensive, particularly, in instances in which a number of optical fibers must be individually aligned.

Accordingly, several commercial alignment systems have been developed to automatically connect, or pigtail, an opto-electronic device, such as a laser diode, to an optical fiber. For example, Melles Griot has developed a system for precisely aligning optical fibers with other optical components. As known to those skilled in the art, however, the Melles Griot alignment system generally includes a variety of relatively complex and costly components which significantly increase the fabrication costs to produce such precisely aligned optical devices. In addition, once the optical fiber has been aligned by a Melles Griot alignment system, the optical fiber must generally be bonded with a separate bonding means, such as solder, as described in the foregoing patents.

In addition, none of the above-described alignment methods and systems precisely align an optical fiber within a hermetically sealed package, such as a standard 14-pin hermetic butterfly package, in which opto-electronic devices are typically disposed. As known to those skilled in the art, the precise alignment of an optical fiber to an optical device within a hermetically sealed package is complicated since, in addition to precisely aligning the optical fiber in each of the six degrees of freedom, the alignment process must typically be performed without physically contacting or otherwise heating the optical fiber since heat, such as body heat, can cause the optical fiber to move due to thermal expansion, thereby misaligning the optical fiber. In addition, access to an optical fiber within a hermetically sealed package is generally limited since the optical device with which the optical fiber is being aligned is disposed within an internal cavity defined within the hermetic package.

SUMMARY OF THE INVENTION

It is therefore an object of the present invention to provide an improved method and apparatus for precisely aligning an optical fiber.

It is another object of the present invention to provide an improved method and apparatus for aligning an optical fiber with an optical device within a hermetically sealed package.

It is yet another object of the present invention to provide an improved method and apparatus for aligning an optical fiber without physically contacting or otherwise heating the optical fiber.

These and other objects are provided, according to the present invention, by a microactuator for precisely aligning an optical fiber with an optical device which includes a carrier having optical fiber holding means for receiving the optical fiber and positioning means including at least one bimorphic actuator having first and second layers comprised of first and second materials, respectively, which respond differently to electrical stimuli such that the bimorphic actuator can be deflected by electrical stimuli to thereby controllably position the carrier and, in turn, the optical fiber relative to the optical device. The microactuator can also include an alignment support structure, disposed in a fixed relation to the optical device, for supporting the carrier. Thus, by controllably positioning the carrier relative to the alignment support structure, the optical fiber can be precisely aligned with the optical device.

In one advantageous embodiment, the microactuator includes first and second bimorphic actuators for controllably positioning the carrier in first and second orthogonal directions, respectively, relative to the alignment support structure. The microactuator can also include a third bimorphic actuator for positioning the carrier in a third direction, orthogonal to the first and second directions. Accordingly, the carrier and the optical fiber mounted to the carrier can be controllably positioned in three orthogonal directions relative to the alignment support structure and, in turn, to the optical device.

In one embodiment, the first and second materials from which the bimorphic actuator is formed have first and second coefficients of thermal expansion, respectively. For example, the bimorphic actuator can include a first layer of silicon and a second layer of a metallic material. The microactuator of this embodiment also includes current supply means for providing current to the bimorphic actuator such that the first and second materials differentially expand, thereby deflecting the respective bimorphic actuator. In another embodiment, the second layer of the bimorphic actuator is formed of a piezoelectric material, such as PZT or PMN. The microactuator of this embodiment also includes voltage supply means for supplying voltage to the piezoelectric bimorphic actuator such that the bimorphic actuator deflects.

In either embodiment, the carrier can also include a carrier body to which the bimorphic actuator is affixed. In particular, each bimorphic actuator can include an elongate central portion extending between opposed end portions. The opposed end portions can be affixed to the carrier body such that the elongate central portion bends in response to electrical stimuli, such as current which induces differential expansion between the first and second layers.

The alignment support structure can also include means for securing the carrier to the alignment support structure once the optical fiber is aligned with the optical device. In one embodiment, the alignment support structure includes at least one post formed, such as by a LIGA process involving a combination of lithography, electroforming and molding, so as to extend outwardly from the alignment support structure. The carrier can also define at least one aperture etched therethrough and adapted to receive a respective post therein. The aperture defined in the carrier can have a frustoconical shape to facilitate relative movement between the carrier and a respective post of the alignment support structure and can include an adhesive adapted to bond the outwardly extending post of the alignment support structure to the carrier once the optical fiber is precisely aligned with the optical device.

In addition, the alignment support structure can include a recessed portion adapted to receive and hold an optical device, such as a laser diode. Furthermore, the alignment support structure can define a reference location and can include bias means for urging a predetermined portion of the carrier toward the reference location of the alignment support structure. In one embodiment, the bias means includes a plurality of springs for contacting the carrier and for urging the predetermined portion of the carrier toward the reference location. The alignment support structure can also be comprised of a thermally conductive material for drawing heat from the optical device.

Accordingly, the microactuator of the present invention precisely aligns an optical fiber with an optical device, such as a laser diode, due to the controlled deflection of the bimorphic actuators of the microactuator. In addition, during the process of aligning and bonding an optical fiber, the microactuator of the present invention does not heat or otherwise perturb adjacent microactuators or the optical fibers maintained therein such that a plurality of adjacent optical fibers can be precisely aligned.

Moreover, since the bimorphic actuators of the microactuator do not physically contact the optical fiber, the microactuator of the present invention can precisely align an optical fiber with an optical device within a hermetically sealed package, such as a butterfly package. In addition, the microactuator of the present invention can be readily fabricated in an economical manner. Thus, the microactuator can remain within a hermetically sealed package to facilitate subsequent realignment or repositioning of the optical fiber. Alternatively, the microactuator can permanently bond an optical fiber in an aligned relationship with the optical device.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
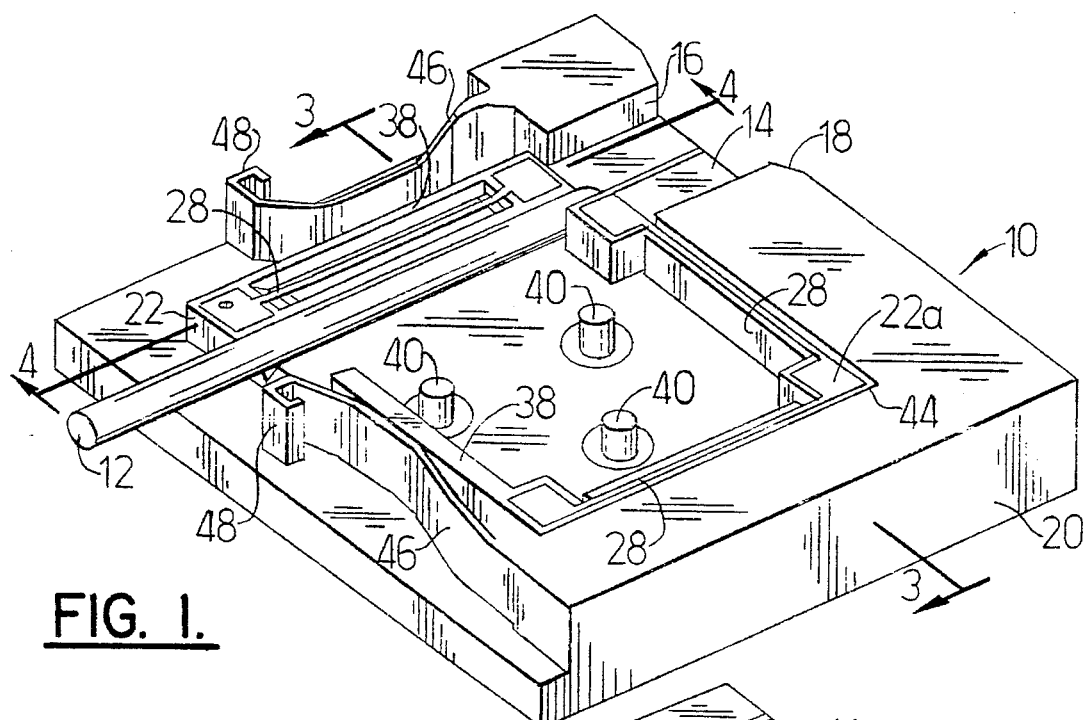
FIG. 1 is a perspective view illustrating a microactuator according to one embodiment of the present invention.

Referring now to FIG. 1, a microactuator 10 for precisely aligning an optical fiber 12 with an optical device 14 is illustrated. For example, the microactuator can align the optical fiber with an optical device, such as a laser diode, which is held within a corresponding recess 16 defined by the microactuator. Alternatively, the microactuator can precisely align an optical fiber with an external optical device, i.e., an optical device which is not mounted upon or otherwise held by the microactuator. In either instance, however, the microactuator is positioned in a fixed relation to the optical device.

In addition, the microactuator 10 can position various types of optical fibers 12 including multi-mode, single mode, and polarization preserving optical fibers. However, the microactuator of the present invention is particularly adapted to position single mode optical fibers in an aligned position since the microactuator can readily position optical fibers with the precision required to efficiently couple single mode optical fibers. In addition, the microactuator can align an optical fiber which includes a lensed facet. However, the microactuator can, alternatively, align an optical fiber having a cleaved end facet without departing from the spirit and scope of the present invention.

Figure 2:
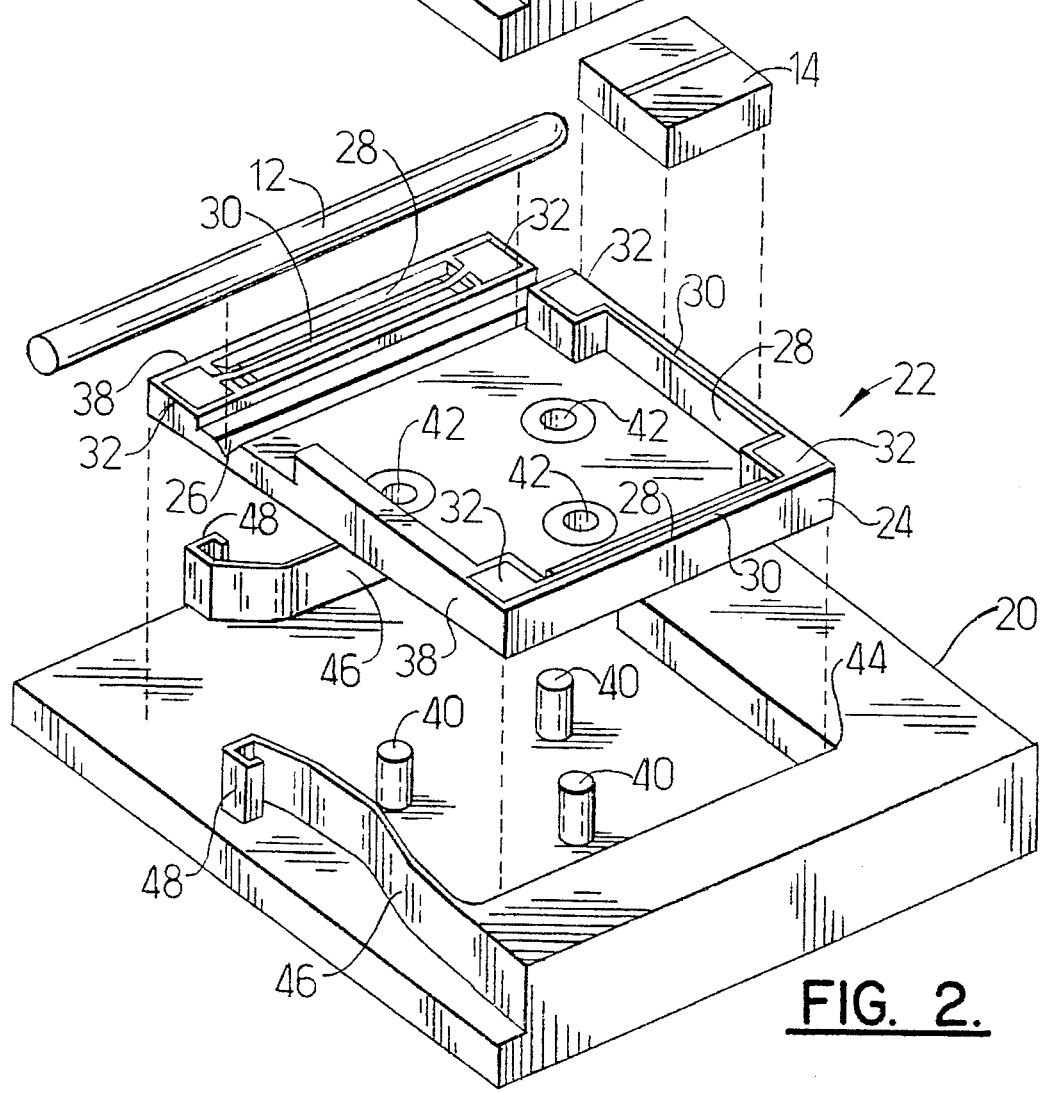
FIG. 2 is an exploded perspective view illustrating the microactuator of FIG. 1 including the alignment support structure and the carrier in greater detail.

The microactuator 10 typically includes an alignment support structure 20 as illustrated in FIGS. 1 and 2. The alignment support structure is disposed in a fixed relation to the optical device 14. For example, the alignment support structure can include a recessed portion 16 which is adapted to receive and hold the optical device. As illustrated in FIGS. 1 and 2, a laser diode can be disposed within the recessed portion defined by the alignment support structure. As also shown, the alignment support structure of this embodiment can include a chamfered opening 18 so as to reduce or eliminate back reflections from the optical device.

The alignment support structure 20 is preferably comprised of a thermally conductive material to serve as a heatsink for drawing heat from the optical device 14 as described hereinafter. In addition, once the carrier 22 has been bonded to the alignment support structure, the alignment support structure also draws heat from the carrier. By drawing heat from the optical device and the carrier, the carrier and, in turn, the optical fiber 12 can be maintained at a predetermined constant temperature such that the alignment of the optical fiber is not altered or otherwise affected due to temperature fluctuations. In one exemplary embodiment, the alignment support structure is comprised of a metallic material, such as copper or nickel.

The alignment support structure 20 can be fabricated by a variety of processes as known to those skilled in the art. For example, the alignment support structure can be electroformed, such as by a LIGA process, in order to obtain relatively large height-to-width ratios. By obtaining relatively large height-to-width ratios, the alignment support structure can include vertical sidewalls having precise tolerances. As known to those skilled in the art, a LIGA process is based upon a combination of lithography, electroforming and molding. In fact, the acronym LIGA is derived from the German translation of lithography, electroforming and molding, namely, Lithografie, Galvanoformung and Abformung.

The microactuator 10 also includes a carrier 22, movably mounted to the alignment support structure 20, for holding the optical fiber 12 in a fixed relation thereto. As shown in FIG. 2, the carrier 22 preferably includes a carrier body 24 having an optical fiber holding means, such as a groove 26 defined in the carrier body, for receiving and holding the optical fiber in a fixed relation to the carrier body. As illustrated in cross-section in FIG. 3, the groove can be V-shaped and, in one embodiment, has opposed sidewalls which define an angle of 55° with respect to the surface of the carrier body. However, the groove can have a variety of other cross-sectional shapes without departing from the spirit and scope of the present invention.

In one embodiment, the carrier 22 is comprised of silicon. Thus, the V-shaped groove 26 can be formed by anisotropically wet etching the carrier body. However, the carrier can be comprised of other materials, such as metallic materials, without departing from the spirit and scope of the present invention.

The V-shaped groove 26 preferably has a predetermined depth such that the optical fiber 12 will initially be held slightly below, such as 5 µm below, the final aligned position of the optical fiber. Thus, the microactuator 10 can controllably adjust the position of the optical fiber upwardly and into alignment with the optical device 14 as described hereinafter. However, the groove can be formed so as to initially hold the optical fiber in other predetermined relationships to the final aligned position of the optical fiber without departing from the spirit and scope of the present invention.

In order to maintain the optical fiber 12 in a fixed relation to the carrier body 24, the optical fiber is preferably bonded within the groove 26. For example, the optical fiber can be bonded to the carrier with an optical fiber bonding agent, such as Gould GlasSolder™ bonding agent, or a high temperature fluxless solder, such as gold/tin eutectic alloy solder. As known to those skilled in the art, the optical fiber is also preferably metallized, such as with titanium, platinum and gold, in order to be securely bonded within the groove.

The microactuator 10 of the present invention also includes positioning means for controllably positioning the carrier 22 relative to the alignment support structure 20 such that the optical fiber 12 is, in turn, precisely aligned with the optical device 14. In one embodiment, the carrier includes the positioning means which can include at least one bimorphic actuator 28, such as a BIMORPH® element manufactured by Morgan Matroc, Inc. For example, in the illustrated embodiment, the carrier includes three bimorphic actuators which are adapted to controllably position the carrier in three orthogonal directions relative to the alignment support structure.

Figure 3:
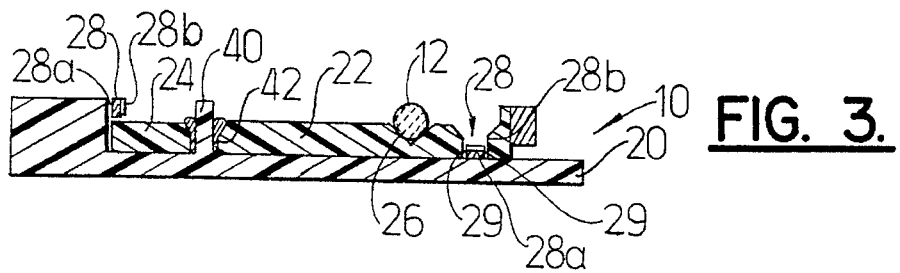
FIG. 3 is a cross-sectional view of the microactuator in one embodiment of the present invention taken along line 3—3 of FIG. 1.
Figure 4:
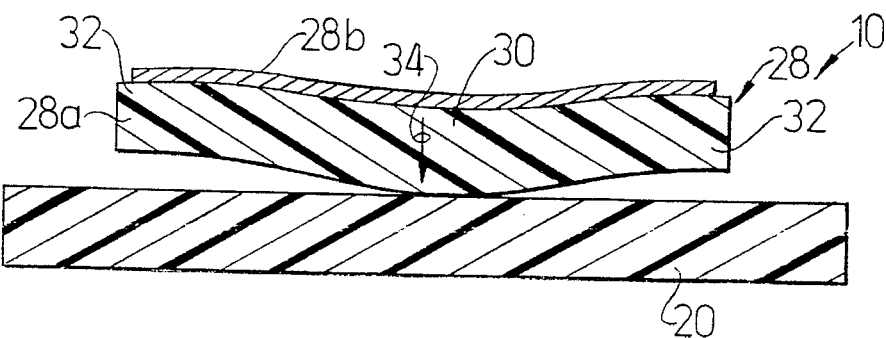
FIG. 4 is a cross-sectional view of a microactuator according to one embodiment of the present invention taken along line 4—4 of FIG. 1.

As illustrated in FIGS. 3 and 4, each bimorphic actuator 28 is preferably comprised of first and second layers 28a and 28b. The first and second layers are formed of first and second materials, respectively, which respond differently to electrical stimuli. Thus, by electrically stimulating the bimorphic actuator, the bimorphic actuator will deflect in a predetermined direction by a controllable amount. Typically, the amount of the deflection of the bimorphic actuator will be proportional to the magnitude of the electrical stimulation.

Figure 5:
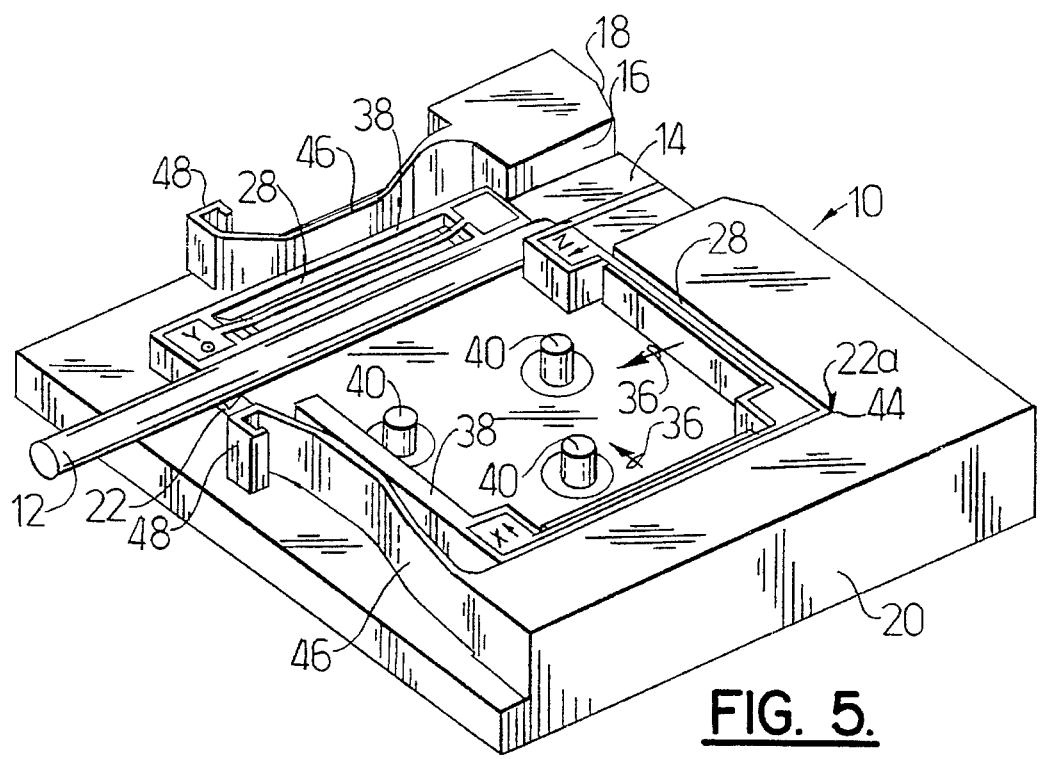
FIG. 5 is a perspective view illustrating the deflection of a bimorphic actuator and the resulting movement of the carrier relative to the alignment support structure of the microactuator of one embodiment of the present invention.

Each bimorphic actuator 28 generally includes an elongate central portion 30 extending between opposed end portions 32 as shown in FIG. 4. The opposed end portions can be affixed to the carrier body 24 while the elongate central portion is separated from the carrier body as shown in FIG. 3. Alternatively, the opposed end portions can be disposed within slots defined by the carrier body to thereby permit limited relative movement between the opposed end portions and the carrier body. Thus, upon electrical stimulation of the bimorphic actuator, the elongate central portion of the bimorphic actuator will bend in a predetermined direction, such as downwardly as shown in FIG. 5 and as indicated by arrow 34 in FIG. 4. Upon bending in the predetermined direction, the bimorphic actuator is urged against the alignment support structure 20 so as to apply an oppositely directed force to the carrier 22, thereby moving the carrier relative to the alignment support structure. Accordingly, the carrier can be controllably positioned relative to the alignment support structure such that the optical fiber 12 bonded to the carrier is precisely aligned with the optical device 14.

As illustrated, the microactuator 10 of one advantageous embodiment includes three orthogonally positioned bimorphic actuators 28 adapted to move the carrier 22 in three orthogonal directions, namely, the x, y and z directions as designated for purposes of illustration in FIG. 1, relative to the alignment support structure 20. Thus, by electrically stimulating the respective bimorphic actuators independently, the carrier and, in turn, the optical fiber 12 bonded thereto, can be controllably positioned in each of the three orthogonal directions. In addition, the rotational alignment of the optical fiber with the optical device 14 is provided by the precise formation of the groove 26 relative to the recessed portion 18 of the alignment support structure which holds the optical device.

According to one embodiment, the first and second layers 28a and 28b of each of the bimorphic actuators 28 are comprised of first and second materials, respectively. The first and second materials of this embodiment are selected to have first and second coefficients of thermal expansion, respectively. For example, the first material can be silicon while the second material is a metal, such as nickel or copper, having a larger coefficient of thermal expansion than the first material. The metallic second layer can be deposited on the first layer by a variety of methods, including preferential sputtering, directed evaporation and electroplating, without departing from the spirit and scope of the present invention.

In this embodiment, the microactuator 10 also includes current supply means for providing current to the bimorphic actuator 28 to resistively heat the bimorphic actuator such that the first and second materials of the first and second layers, respectively, differentially expand, thereby deflecting the bimorphic actuator. In order to facilitate electrical stimulation of the bimorphic actuators, bonding pads, typically comprised of a conductive material, such as gold, are formed on the opposed end portions 32 of the bimorphic actuators such that an electrical current can be established therebetween.

In other words, since the end portions 32 of the bimorphic actuators 28 are affixed to the carrier body 24 and since the metallic layers expand to a greater degree than the respective silicon layers, the elongate central portions 30 of the bimorphic actuators bend downwardly and outwardly as shown in FIG. 5. The elongate central portions of the first and second bimorphic actuators, i.e., the x- and z-bimorphic actuators, are therefore urged against respective sidewalls of the alignment support structure 20 such that the carrier 22 is moved in a direction away from the sidewalls in response thereto as indicated by arrows 36 in FIG. 5. Likewise, the elongate central portion of the third bimorphic actuator, i.e., the y-bimorphic actuator, is urged downwardly against the alignment support structure such that the carrier is moved upwardly in response thereto as shown in FIGS. 4 and 5. In order to facilitate movement of the third bimorphic actuator, the elongate central portion is preferably separated from the remainder of the carrier body 24 by relief grooves 29 defined laterally alongside the elongate central portion as best shown in FIG. 3 which allow the bimorphic actuator to flex. By therefore controlling the current supplied to the bimorphic actuators, the amount of the bending or deflection and, consequently, the position of the carrier relative to the alignment support structure can be controlled since the amount of bending is generally proportional to the current supplied to the individual bimorphic actuators.

A bimorphic actuator 28 having a first layer 28a comprised of a highly doped semiconductor material, such as highly doped silicon, can also be heated by introducing current to the highly doped semiconductor material. By introducing current to a first layer comprised of a highly doped semiconductor material, the bimorphic actuator can be resistively heated such that the first and second layers differentially expand, thereby deflecting the bimorphic actuator. In addition, sufficient resistive heating can generally be provided by relatively small amounts of the current, such as 10 mA, thereby reducing the power requirements for the microactuator 10 of this embodiment.

Alternatively, in embodiments in which the metallic second layer 28b of the bimorphic actuator 28 has a relatively low resistance, such as a second layer comprised of nickel, copper, gold or aluminum, the bimorphic actuator can include an additional layer comprised of a material having a greater resistance than that of the metallic second layer. The bimorphic actuator of this embodiment can also include an insulating layer, such as a layer of silicon dioxide, disposed between the metallic second layer and the additional layer having a greater resistance. Thus, by providing current to the additional layer of relatively high resistance, the various layers of the bimorphic actuator will be heated and will differentially expand such that the bimorphic actuator controllably bends or deflects as described above.

In another embodiment, each bimorphic actuator 28 includes a second layer 28b of an electrostrictive or piezoelectric material which, as known to those skilled in the art, will controllably move or deflect upon the application of a voltage thereto. Thus, the microactuator 10 of this embodiment also includes voltage supply means for providing a voltage to the bimorphic actuator such that the bimorphic actuator controllably deflects. In one exemplary embodiment, the bimorphic actuator includes a first layer 28a comprised of silicon and a second layer comprised of a piezoelectric material, such as PZT or PMN. By controlling the voltage supplied to the bimorphic actuator, the amount of deflection or bending of the bimorphic actuator and, consequently, the position of the carrier 22 relative to the alignment support structure 20 can likewise be controlled. As described above, bonding pads are preferably disposed on the opposed end portions 32 of the bimorphic actuator such that a predetermined voltage can be established therebetween.

Thus, the microactuator 10 of the present invention can align an optical fiber 12 with an optical device 14 by controllably varying the deflection of the respective bimorphic actuators 28. As the respective bimorphic actuators are deflected, the efficiency with which the optical signals produced by the optical device are coupled to and transmitted via the optical fiber can be detected. Once the position in which the optical signals are most efficiently transmitted via the optical fiber is detected, such as by detecting the maximum output power, the optical fiber can be held in position by the bimorphic actuators while the relative positions of the carrier 22 and the alignment support structure 20 are fixed, such as by bonding the carrier to the alignment support structure.

In one embodiment, the alignment support structure 20 includes means for securing the carrier 22 thereto once the optical fiber 12 is aligned with the optical device 14. As shown in FIGS. 1 and 2, the securing means can include at least one outwardly extending post 40 which is preferably formed by a LIGA process. In addition, the carrier of this embodiment preferably defines at least one aperture 42 adapted to receive a respective post therein. The apertures defined by the carrier are preferably anisotropically wet-etched or laser cut therein and, in one embodiment, are frustoconical in shape so as to facilitate movement between the carrier and the post of the alignment support structure.

As illustrated, the groove 26 and the apertures 42 are preferably anisotropically etched in the carrier 22 in two different directions or orientations, such as <110> and <100>. In order to provide such different types of etching, the carrier can be comprised of at least two different wafers, such as silicon wafers, having different orientations, such as <110> and <100> in the above example. In addition, the carrier can be coated with a material having a relatively low coefficient, such as a TEFLON® coating, in order to reduce the frictional forces between the carrier and the alignment support structure 20.

The securing means of the alignment support structure 20 can also include an adhesive adapted to bond the outwardly extending posts 40 of the alignment support structure to the carrier 22 once the optical fiber 12 is precisely aligned with the optical device 14. For example, a bonding agent, such as gold/tin eutectic alloy solder, a Gould GlasSolder™ bonding agent or glass frit, can be disposed on the interior surface of the aperture defined by the carrier. Once the optical fiber is precisely aligned with the optical device, the adhesive can be activated, such as by laser heating or resistive heating, to bond the carrier to the alignment support structure. Once the alignment support structure and the carrier are bonded, the alignment of the optical fiber with the optical device is maintained irrespective of further electrical stimulation of the bimorphic actuators 28.

The microactuator 10 and, more preferably, the alignment support structure 20 can define a reference location 44 with which a predetermined portion of the carrier 22, such as a predetermined corner 22a, is preferably initially positioned. Thereafter, the position of the carrier can be adjusted relative to the alignment support structure such that the optical fiber 12 is precisely aligned with the optical device 14.

Furthermore, the carrier 22 can be initially positioned relative to the alignment support structure 20 such that the optical fiber 12 is slightly misaligned, such as by 5–10 micrometers, relative to the optical device in a predetermined direction. The predetermined direction is preferably selected based upon the relative movement provided by the bimorphic actuators 28 such that the bimorphic actuators can compensate for the slight misalignment and can align the optical fiber with the optical device. In other words, the bimorphic actuators of the microactuator 10 are generally designed to move the carrier, and, in turn, the optical fiber in a predetermined direction, typically one predetermined direction, relative to the alignment support structure as illustrated by arrows 34 and 36 in FIGS. 4 and 5. Therefore, the carrier is preferably initially positioned so as to be slightly misaligned in a direction opposite that indicated by arrows 34 and 36 such that movement of the carrier in the predetermined direction by the bimorphic actuators compensates for the slight misalignment and, in fact, brings the optical fiber into alignment with the optical device.

In one embodiment, the alignment support structure 20 also includes bias means for urging the predetermined portion of the carrier 22 towards the reference location 44 defined by the alignment support structure. In the illustrated embodiment, the bias means includes a plurality of springs 46 for contacting the carrier, such as a sidewall 38 of the carrier, and for urging the predetermined portion of the carrier toward the reference location. In particular, the alignment support structure of the illustrated embodiment includes first and second springs for urging the carrier in first and second orthogonal directions, respectively, toward the reference location.

As illustrated in FIGS. 1 and 5, the first and second springs 46 preferably urge the carrier 22 in first and second directions, respectively, which are substantially opposite to the first and second directions in which the first and second bimorphic actuators 28, i.e., the x- and z-bimorphic actuators, urge the carrier. The bias force provided by the springs is preferably less than the force provided by the bimorphic actuators upon deflection, however, such that deflection of the bimorphic actuators overcomes the bias force of the springs and frictional forces between the carrier and the alignment support structure 20 so as to move the predetermined portion of the carrier away from the reference location 44.

The springs 46 can also be formed during a LIGA process so as to have relatively large height-to-width ratios. In addition, the springs can include a curved or hook member 48 to facilitate opening or spreading of the springs upon mounting of the carrier 22 to the alignment support structure 20. In particular, a microprobe can engage a respective hook member so as to open or spread the spring during mounting of the carrier.

Figure 6:
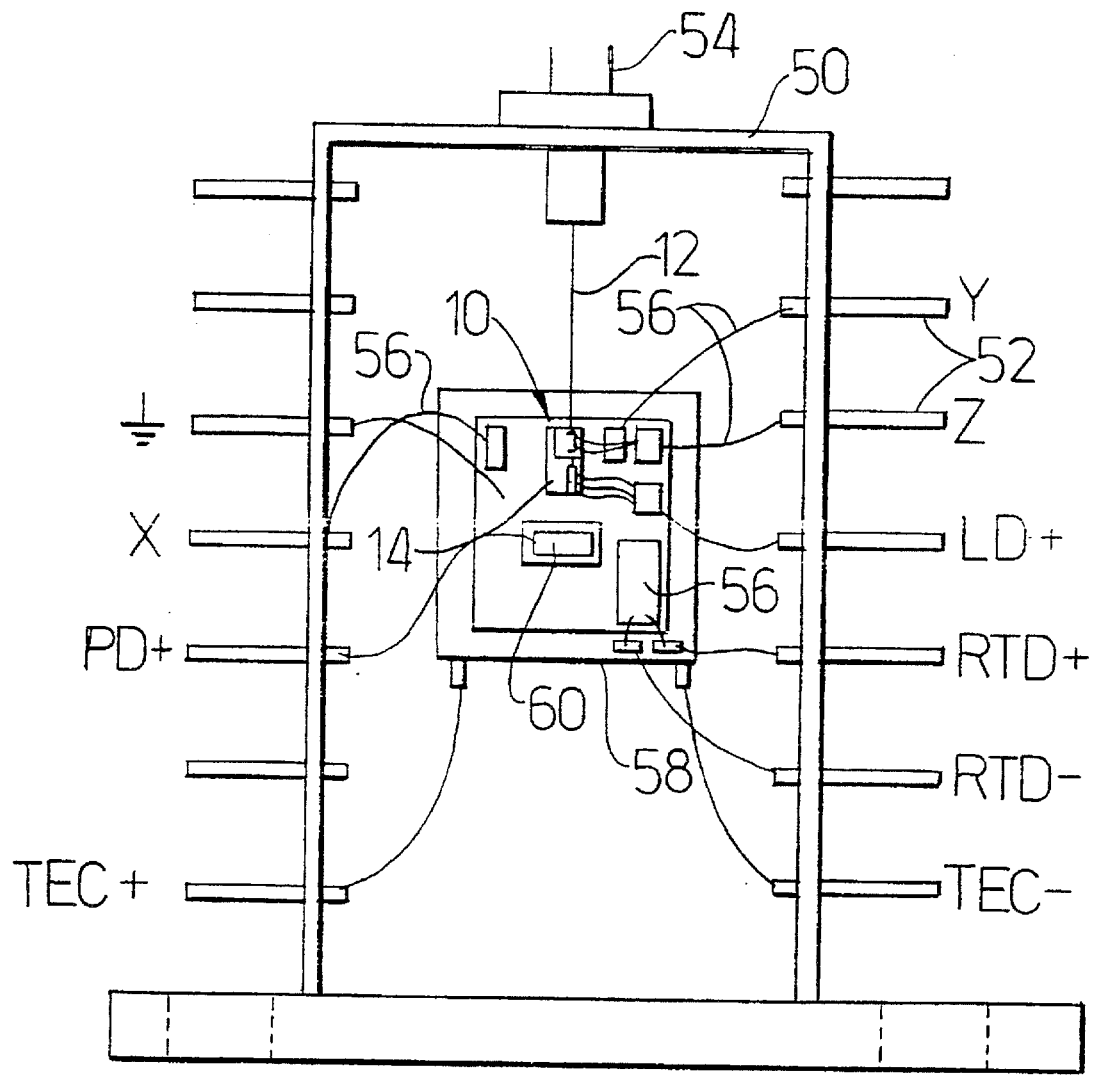
FIG. 6 is a schematic representation of the microactuator of one embodiment of the present invention disposed within a hermetically sealed package for aligning an optical fiber with an optical device which is also disposed within a hermetically sealed package.

In one exemplary embodiment illustrated schematically in FIG. 6, the microactuator 10 of the present invention can controllably align an optical fiber 12 with an optical device 14, such as a laser diode, within a hermetically sealed package, such as a hermetically sealed butterfly package. According to the present invention, the microactuator can align the optical fiber with the optical device prior to or following the hermetic sealing of the package. If the optical fibers are aligned prior to hermetically sealing the package, the package can thereafter be potted, such as with a plastic material, or a lid may be affixed to the package, such as by laser welding or seam sealing, such that the package housing the aligned optical fibers is hermetically sealed.

As known to those skilled in the art, the hermetically sealed package typically includes a hermetic canister 50, such as a gold-plated KOVAR™ canister having a plurality of KOVAR™ feed-through pins 52 which are glass-to-metal hermetically sealed to the canister. An optical device 14 and a microactuator 10 having an optical fiber 12 mounted thereto are also disposed within the hermetic canister. In order to effectively seal the hermetic canister, the optical fiber is preferably metallized and soldered to the fiber optic sealing tube 54 of the hermetic canister. As also known to those skilled in the art, the hermetically sealed package can also include means for controlling the temperature of the optical device including a thermistor 56 and a thermal electric cooler 58. Furthermore, the hermetically sealed package can include a photodetector 60 for detecting the output of the optical device such that the excitation energy supplied to the optical device and the resulting output of the optical device can be controlled as desired, such as controlling the excitation energy supplied to the optical device such that a constant output is provided by the optical device.

The optical fiber 12 is preferably aligned with the optical device 14 with the microactuator 10 within the hermetic canister 50 as described above. In particular, the bimorphic actuators 28 of the microactuator, as well as the other electrical components disposed within the hermetic canister, are electrically stimulated, such as by leads 56 extending from respective pins 52 of the hermetically sealed package as illustrated in FIG. 6. Thus, by controllably adjusting the respective deflections provided by the bimorphic actuators, the alignment of the optical fiber to the optical device can be controlled. In particular, the first, second and third bimorphic actuators can be controllably adjusted in three orthogonal directions by providing appropriate electrical stimulation via the leads identified as X, Y and Z in FIG. 6. Furthermore, by detecting the efficiency with which the optical signals produced by the optical device are coupled to the optical fiber, the optical fiber can be precisely aligned with the optical device.

Thereafter, the relative positions of the optical fiber 12 and the optical device 14 can be fixed by bonding the carrier 22 to the alignment support structure 20, such as by heating the adhesive disposed within the respective apertures 42 defined by the carrier. For example, the hermetic canister 50 can include a transparent window through which a laser can be directed so as to heat the adhesive and bond the carrier to the alignment support structure. Alternatively, the hermetically sealed package can include an additional lead which is electrically connected to the alignment support structure in the vicinity of the adhesive such that the adhesive can be resistively heated and the carrier can thereby be bonded to the alignment support structure.

Accordingly, an optical fiber 12 can be precisely aligned with an optical device 14, such as a laser diode, within a hermetically sealed package. Once the optical fiber is precisely aligned, the respective positions of the optical fiber and the optical device can be fixed such that the precise alignment is maintained. The microactuator can thereafter remain within the hermetically sealed package following the alignment of the optical fiber with the optical device, thereby further insuring that the optical fiber maintains alignment with the optical device. For example, in embodiments in which the carrier 22 is not bonded to the alignment support structure 20 following the alignment of the optical fiber with the optical device, the microactuator can subsequently reposition or realign the optical fiber with the optical device to compensate for variations in the optical alignment which occur during use.

In addition to a hermetically sealed package which includes an optical device 14, such as a laser diode, one or more microactuators 10 can be disposed within a fiber optic connector as described in a copending U.S. patent application entitled "A Fiber Optic Connector Having At Least One Microactuator For Precisely Aligning An Optical Fiber And An Associated Fabrication Method" filed Jun. 7, 1995 and bearing Ser. No. 08/486,242 and assigned to the assignee of the present invention, the contents of which are expressly incorporated herein in their entirety. As described, the microactuator can precisely align optical fibers with respective lens elements of the fiber optic connector in order to collimate the optical signals transmitted therethrough.

Therefore, the microactuator 10 of the present invention precisely aligns an optical fiber 12, such as a single mode optical fiber, with an optical device 14, such as a laser diode, due to the controlled deflection of the bimorphic actuators 28 of the microactuator. In addition, during the process of aligning and bonding an optical fiber, the microactuator of the present invention does not heat or otherwise perturb adjacent microactuators or the optical fibers maintained therein such that a plurality of adjacent optical fibers can be precisely aligned.

Since the microactuator does not require physical contact with the optical fiber, the microactuator of the present invention can precisely align an optical fiber to an optical device within a hermetically sealed package, such as a butterfly package. In addition, the microactuator of the present invention can be readily fabricated in an economical manner such that the microactuator can remain within a hermetically sealed package following the initial alignment of the optical fiber with the optical device so as to maintain alignment or provide realignment of the optical fiber during operation of the optical device. Alternatively, the microactuator can permanently bond an optical fiber in an aligned relationship with the optical device.

In the drawings and the specification, there has been set forth preferred embodiments of the invention and, although specific terms are employed, the terms are used in a generic and descriptive sense only and not for the purpose of limitation, the scope of the invention being set forth in the following claims.

That which is claimed is:

1. A microactuator for precisely aligning an optical fiber with an optical device, the microactuator comprising:

an alignment support structure disposed in a fixed relation to the optical device, wherein said alignment support structure defines at least one well; and a carrier, movably mounted at least partially within the well defined by said alignment support structure, for holding the optical fiber in a fixed relation thereto, said carrier including at least one bimorphic actuator comprising first and second layers comprised of first and second materials, respectively, wherein the first and second materials respond differently to electrical stimuli such that said bimorphic actuator is deflected in a predetermined direction by the electrical stimuli and operably urged against a portion of said alignment support structure to thereby move said carrier in a direction opposite the predetermined direction in which said bimorphic actuator is deflected such that said carrier is controllably positioned relative to said alignment support structure and the optical fiber is precisely aligned with the optical device.

2. A microactuator according to claim 1 wherein said carrier comprises first and second bimorphic actuators, each bimorphic actuator comprising first and second layers comprised of first and second materials, respectively, which respond differently to electrical stimuli, wherein said first and second bimorphic actuators are disposed such that said first and second bimorphic actuators deflect in first and second orthogonal directions, respectively, in response to electrical stimuli to thereby controllably position said carrier in the first and second orthogonal directions relative to said alignment support structure.

3. A microactuator according to claim 2 wherein said carrier further comprises a third bimorphic actuator having first and second layers comprised of first: and second materials, respectively, which respond differently to electrical stimuli, wherein said third bimorphic actuator is disposed so as to deflect in a third direction, orthogonal to the first and second directions, in response to electrical stimuli to thereby controllably position said carrier in the third direction relative to said alignment support structure.

4. A microactuator according to claim 1 wherein said bimorphic actuator is comprised of first and second layers comprising first and second materials, respectively, and having first and second coefficients of thermal expansion, respectively, and wherein the microactuator comprises current supply means for providing current to said bimorphic actuator such that the first and second materials differentially expand to thereby deflect said bimorphic actuator.

5. A microactuator according to claim 4 wherein the first material is silicon and the second material is a metal.

6. A microactuator according to claim 1 wherein the second layer of said bimorphic actuator is comprised of a piezoelectric material, and wherein the microactuator comprises voltage supply means for providing a voltage to said bimorphic actuator such that said bimorphic actuator is deflected.

7. A microactuator according to claim 6 wherein the first material is silicon and the second material is selected from the group consisting of PZT and PMN.

8. A microactuator according to claim 1 wherein said alignment support structure further comprises a recessed portion adapted to receive and hold the optical device therein.

9. A microactuator according to claim 1 wherein said alignment support structure defines a reference location, and wherein said alignment support structure further comprises bias means for urging a predetermined portion of said carrier toward the reference location defined by said alignment support structure.

10. A microactuator according to claim 9 wherein said bias means of said alignment structure comprises a plurality of springs for contacting said carrier and for urging the predetermined portion of said carrier toward the reference location.

11. A microactuator according to claim 10 wherein said alignment support structure is comprised of a thermally conductive material for drawing heat from said carrier.

12. A microactuator for precisely aligning an optical fiber with an optical device, the microactuator comprising:

an alignment support structure disposed in a fixed relation to the optical device; and a carrier comprising a carrier body, movably mounted to said alignment support structure, for holding the optical fiber in a fixed relation thereto, said carrier including at least one bimorphic actuator comprising an elongate central portion extending between opposed end portions which are affixed to said carrier body, wherein the elongate central portion of said bimorphic actuator comprises first and second layers comprised of first and second materials, respectively, and wherein the first and second materials respond differently to electrical stimuli such that said bimorphic actuator is deflected by bending the elongate central portion in response to the electrical stimuli to thereby controllably position said carrier relative to said alignment support structure such that the optical fiber is precisely aligned with the optical device.

13. A microactuator for precisely aligning an optical fiber with an optical device, the microactuator comprising:

an alignment support structure disposed in a fixed relation to the optical device; and a carrier, movably mounted to said alignment support structure, for holding the optical fiber in a fixed relation thereto, said carrier including at least one bimorphic actuator comprising first and second layers comprised of first and second materials, respectively, wherein the first and second materials respond differently to electrical stimuli such that said bimorphic actuator is deflected by the electrical stimuli to thereby controllably position said carrier relative to said alignment support structure such that the optical fiber is precisely aligned with the optical device, wherein said alignment support structure comprises means for securing said carrier thereto once the optical fiber is aligned with the optical device, wherein said securing means of said alignment support structure comprises at least one outwardly extending post, and wherein said carrier defines at least one aperture for receiving a respective post therein.

14. A microactuator according to claim 13 wherein said securing means of said alignment support structure further comprises an adhesive adapted to bond said outwardly extending post of said alignment support structure to said carrier once the optical fiber is precisely aligned with the optical device.

15. A microactuator according to claim 13 wherein said aperture defined by said carrier has a frustoconical shape to facilitate relative movement between said carrier and said outwardly extending post of said alignment support structure.

16. A microactuator for precisely aligning an optical fiber with an optical device, the microactuator comprising:

an alignment support structure disposed in a fixed relation to the optical device, wherein said alignment support structure defines a reference location;

a carrier, movably mounted to said alignment support structure, said carrier comprising:

a carrier body; and optical fiber holding means for receiving the optical fiber and for maintaining the optical fiber in a fixed relation to said carrier body;

bias means for exerting a bias force upon said carrier to thereby urge a predetermined portion of said carrier toward the reference location defined by said alignment support structure; and positioning means for controllably positioning said carrier in at least two orthogonal directions relative to said alignment support structure, wherein said positioning means at least partially overcomes the bias force exerted by said bias means and moves said carrier away from the reference location defined by said alignment support structure such that the optical fiber is precisely aligned with the optical device.

17. A microactuator according to claim 16 wherein said positioning means comprises first and second bimorphic actuators, each bimorphic actuator being comprised of first and second layers comprised of first and second materials, respectively, which respond differently to electrical stimuli, and wherein said first and second bimorphic actuators are disposed such that said first and second bimorphic actuators deflect in first and second orthogonal directions, respectively, in response to the electrical stimuli to thereby controllably position said carrier in the first and second orthogonal directions relative to said alignment support structure.

18. A microactuator according to claim 17 wherein said carrier further comprises a third bimorphic actuator having first and second layers comprised of first and second materials, respectively, which respond differently to electrical stimuli, wherein said third bimorphic actuator is disposed so as to deflect in a third direction, orthogonal to the first and second directions, in response to electrical stimuli to thereby controllably position said carrier in the third direction relative to said alignment support structure.

19. A microactuator according to claim 17 wherein each of said bimorphic actuators is comprised of first and second layers comprising first and second materials, respectively, and having first and second coefficients of thermal expansion, respectively, and wherein the microactuator comprises current supply means for providing current to said first and second bimorphic actuators such that the first and second materials differentially expand to thereby deflect said bimorphic actuator.

20. A microactuator according to claim 17 wherein the second layer of said bimorphic actuators is comprised of a piezoelectric material, and wherein the microactuator comprises voltage supply means for providing a voltage to said bimorphic actuators such that said bimorphic actuators are deflected.

21. A microactuator according to claim 17 wherein said bimorphic actuators comprise an elongate central portion extending between opposed end portions, and wherein the opposed end portions are affixed to said carrier body such that the elongate central portion bends in response to the electrical stimuli.

22. A microactuator according to claim 16 wherein said alignment structure comprises a plurality of springs for contacting said carrier and for urging a predetermined portion of said carrier toward the reference location.

23. A microactuator for precisely aligning an optical fiber with an optical device, the microactuator comprising:
   a carrier comprising a carrier body defining a groove therein for receiving the optical fiber and for maintaining the optical fiber in a fixed relation relative to said carrier; and
   at least one bimorphic actuator comprising an elongate central portion extending between opposed end portions which are affixed to said carrier body, wherein said at least one bimorphic actuator has first and second layers comprised of first and second materials, respectively, wherein the first and second materials respond differently to electrical stimuli such that said bimorphic actuator is controllably deflected by bending the elongate central portion in response to the electrical stimuli to thereby position said carrier relative to the optical device such that the optical fiber is precisely aligned with the optical device.

24. A microactuator according to claim 23 wherein said bimorphic actuator is comprised of first and second layers comprising first and second materials, respectively, and having first and second coefficients of thermal expansion, respectively, and wherein said microactuator further comprises current supply means for providing current to said bimorphic actuator such that the first and second materials differentially expand to thereby deflect said bimorphic actuator.

25. A microactuator according to claim 23 wherein the second layer of said bimorphic actuator is comprised of a piezoelectric material, and wherein the microactuator further comprises voltage supply means for providing a voltage to said bimorphic actuator such that said bimorphic actuator is deflected.

26. A microactuator according to claim 23 further comprising an alignment support structure, disposed in a fixed relation to the optical device, for supporting said carrier.

27. A microactuator according to claim 26 wherein said carrier further comprises first and second bimorphic actuators, each bimorphic actuator comprising first and second layers comprised of first and second materials, respectively, which respond differently to electrical stimuli, and wherein said first and second bimorphic actuators are disposed such that said first and second bimorphic actuators deflect in first and second orthogonal directions, respectively, in response to the electrical stimuli to thereby controllably position said carrier in the first and second orthogonal directions relative to said alignment support structure.

28. A microactuator according to claim 27 wherein said carrier further comprises a third bimorphic actuator having first and second layers comprised of first and second materials, respectively, which respond differently to electrical stimuli, and wherein said third bimorphic actuator is disposed so as to deflect in a third direction, orthogonal to the first and second directions, in response to electrical stimuli to thereby controllably position said carrier in the third direction relative to said alignment support structure.

29. A microactuator according to claim 26 wherein said alignment support structure defines a reference location, and wherein said alignment support structure further comprises bias means for urging a predetermined portion of said carrier toward the reference location defined by said alignment support structure.

30. A microactuator according to claim 29 wherein said bias means of said alignment structure comprises a plurality of springs for contacting said carrier and for urging the predetermined portion of said carrier toward the reference location.

31. A method of precisely aligning an optical fiber with an optical device, the method comprising the steps of:
   mounting a carrier at least partially within a well defined by an alignment support structure, wherein the alignment support structure is disposed in a fixed relation to the optical device, and wherein the carrier includes at least one bimorphic actuator having first and second layers comprised of first and second materials, respectively, which respond differently to electrical stimuli;
   disposing the optical fiber in a fixed position relative to the carrier; and
   deflecting the bimorphic actuator in a predetermined direction, wherein said deflecting step comprises operably urging the bimorphic actuator against a portion of the alignment support structure to thereby move the carrier in a direction opposite the predetermined direction in which the bimorphic actuator is deflected such that the carrier is controllably positioned relative to the alignment support structure and the optical fiber is precisely aligned with the optical device.

32. A method according to claim 31 wherein said deflecting step comprises the step of electrically stimulating the bimorphic actuator of the carrier.

33. A method according to claim 31 further comprising the step of bonding the carrier to the alignment support structure following said deflecting step.

34. A method according to claim 31 wherein said disposing step comprises the step of bonding the optical fiber to the carrier.

35. A method of fabricating a microactuator for controllably positioning an optical fiber, the method comprising the steps of:

forming an alignment support structure adapted to be disposed in a fixed relation to an optical device;

forming a carrier of a first material, wherein said carrier forming step comprises forming a carrier body defining a groove for holding an optical fiber therein and at least one actuator having an elongated central portion extending between a pair of end portions affixed to the carrier body;

depositing a layer of a second material on the actuator to thereby form a bimorphic actuator having first and second layers comprised of first and second materials, respectively, which respond differently to electrical stimuli; and mounting the carrier on the alignment support structure such that the carrier can be controllably positioned relative to the alignment support structure.

36. A method according to claim 35 wherein said step of forming the alignment support structure comprises the step of forming an alignment support structure having at least one outwardly extending post, wherein said step of forming the carrier comprises the step of etching at least one aperture therethrough, and wherein said step of mounting the carrier on the alignment support structure comprises the step of extending the outwardly extending post of the alignment support structure into a corresponding aperture defined by the carrier.

37. A method according to claim 35 wherein said step of forming the alignment support structure comprises forming the alignment support structure according to a LIGA process.

* * * * *